United States Patent [19]

Buchanan et al.

[11] Patent Number: 4,900,210
[45] Date of Patent: Feb. 13, 1990

[54] PUSH IN-SCREW OUT FASTENING SYSTEM

[75] Inventors: Jeffery J. Buchanan, Lexington; Terrance A. Cassity, Paris, both of Ky.

[73] Assignee: Square D Company, Palatine, Ill.

[21] Appl. No.: 384,607

[22] Filed: Jul. 19, 1989

[51] Int. Cl.⁴ .............................................. F16B 19/00
[52] U.S. Cl. .................................... 411/508; 411/392; 411/417; 411/510; 411/913
[58] Field of Search ............... 411/508, 510, 509, 904, 411/908, 909, 907, 913, 452, 453, 339, 411, 417, 420, 392, 396; 24/625

[56] References Cited

U.S. PATENT DOCUMENTS 3,244,057 4/1966 Mathison ........................ 411/510 X
3,466,966 9/1969 Brown .................................. 411/510

FOREIGN PATENT DOCUMENTS 520169 4/1940 United Kingdom ................ 411/510
1020694 2/1966 United Kingdom ................ 411/510

Primary Examiner—Rodney M. Lindsey
Attorney, Agent, or Firm—Jose W. Jimenez

[57] ABSTRACT

A fastening system comprises a push in-screw out fastener having a slotted head, threaded cylindrical shank with a plurality of resilient thread segments thereon and a tubular receptacle. The diameter of the receptacle is less than the diameter of the thread segments and greater than the shank diameter such that the thread segments are deformed by insertion of the fastener into the receptacle. The receptacle has an internal thread formed at its entry. The internal thread engages the resilient thread segments to impart a removal force to the fastener when its slotted head is rotated in a counterclockwise direction.

7 Claims, 1 Drawing Sheet

PUSH IN-SCREW OUT FASTENING SYSTEM

BACKGROUND OF THE INVENTION AND PRIOR ART

This invention relates to low cost fastening systems having fasteners that are easy and quick to install and simple to remove.

There are a myriad of fastening systems presently available to meet a great variety of different applications. Many of these systems use a molded tubular plastic fastener and receptacle in which the fastener is pushed or driven into the receptacle and is secured in the receptacle by friction. Removal is accomplished by pulling the fastener out of the receptacle. The fasteners are often referred to as "pine tree" or "Christmas tree" devices and include a circular head and a cylndrical shank having a plurality of thin, circular fins or ribs. The fins are deformed when the fastener is pushed into a receptacle that has an opening or orifice diameter that is less than the diameter of the ribs. The "memory" of the fastener material provides the frictional force that holds it securely in place in the receptacle. Such fasteners are often difficult to remove without damage, either to the fastener or to the components that are being held.

The fastener of the invention comprises, in its preferred embodiment, a molded plastic screw in which the screw thread is divided into a plurality of thread segments. The segmented construction imparts a degree of flexibility that enables the fastener to be pushed into a lesser diameter tubular receptacle without significant permanent distortion of the thread. The receptacle of the invention includes a single internal thread formed near its entry. The thread engages the thread segments when the fastener is turned into a counterclockwise direction and imparts a longitudinal removal force to the fastener. Thus with the invention, the fastener is driven or pushed into the receptacle by deflecting the resilient thread segments. When the thread segments pass through the one thread entry in the receptacle, they attempt to return to their undeflected positions and, in so doing, exert significant holding forces against the inner surface of the receptacle.

OBJECTS OF THE INVENTION

A principal object of the invention is to provide an improved low cost fastening system.

Another object of the invention is to provide a novel push in-screw out fastening system.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
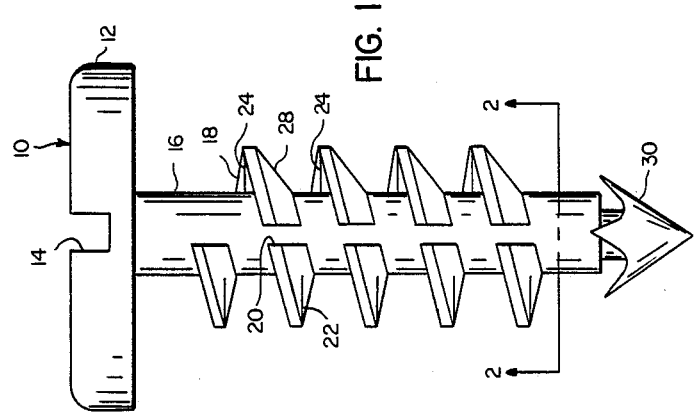
FIG. 1 is a side elevation of a screw fastener constructed in accordance with the invention.
Figure 2:
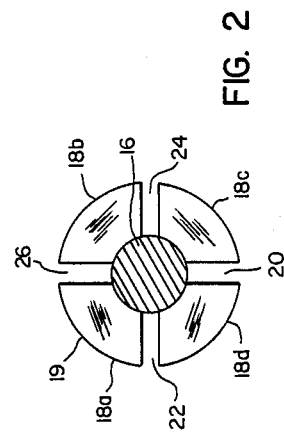
FIG. 2 is a sectional view of the fastener of FIG. 1 taken along the line 2—2.

Referring to FIGS. 1 and 2, a threaded fastener 10 includes a circular head 12, having a screwdriver slot 14 therein, and a cylindrical shank 16. A spiral thread 18 is segmented into a plurality of thread segments 18a, 18b, 18c and 18d to form separated longitudinal slots 20, 22, 24 and 26 (best seen in FIG. 2). The end of shank 16 terminates in a generally cone shaped entry guide 30. Fastener 10 is preferably molded of plastic material with the slots 20–26 and thread segments 18a–18d being formed during the molding process. The thread preferably includes a taper on its lower side, such as indicated by reference numeral 28, to facilitate insertion of threaded fastener 10 into a receptacle. The segmented construction of the thread imparts a significant degree of flexibility to the threaded segments. It should be apparent to those skilled in the art that the number of slots and their size may be altered for different design applications, the criteria being that the fastener must be secured by the restoring force exerted by the deflected thread segments against the inner surface of the tubular receptacle, and that the thread segments must be strong enough to enable removal of the fastener by engaging a threaded portion in the receptacle entry.

Figure 3:
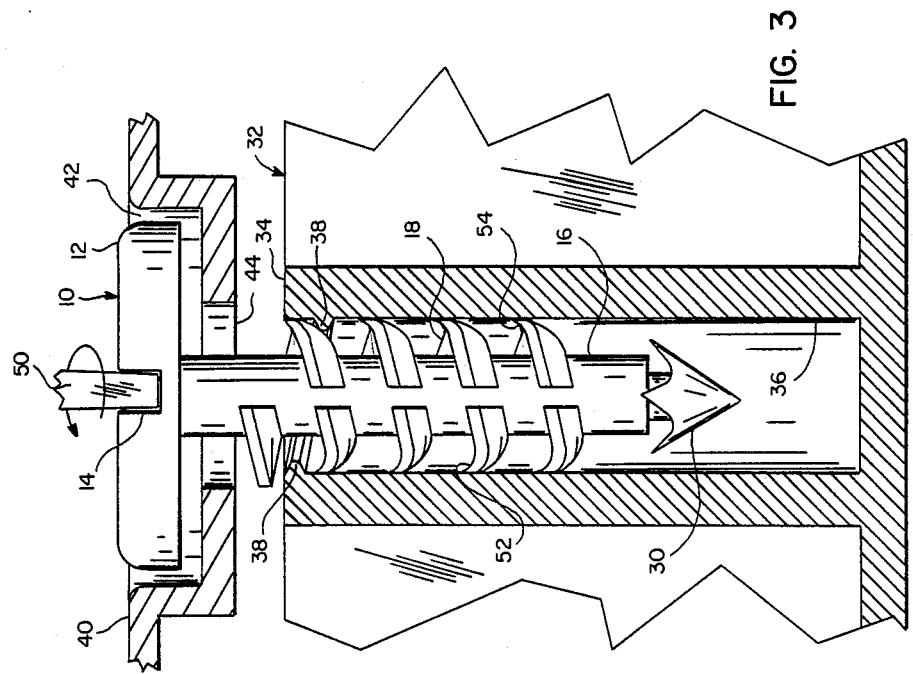
FIG. 3 is a partial sectional view of an enclosure and panel incorporating the fastening system of the invention.

In FIG. 3, a partially shown enclosure 32 has a tubular receptacle 34 formed therein that includes an inner surface 36. The entry of receptacle 34 has a thread 38 of the same pitch as thread 18 on fastener 10 formed therein. A partially shown closing panel 40 has a recess 42 with an aperture 44 at its bottom that the threaded shank of fastener 10 passes through. The fastener head 12 nests within recess 42 when the fastener is installed to secure panel 40 to enclosure 32. It will be apparent that fastener 10 may conveniently be captivated in recess 42 by making aperture 44 slightly smaller in diameter than the diameter of thread 18 and forcing fastener 10 through aperture 44 into position. In this connection, it should be noted that thread segments 18a–18d need not be pie-shaped but may have a generally cloverleaf shape, for example. The term thread diameter should therefore be understood to also mean the greatest distance or widest expanse across the thread segments.

As illustrated at 52 and 54, thread 18 is distorted when pushed into engagement with tubular receptacle 34 and the restoring force exerted by the thread segments against interior surface 36 of receptacle 34 secures fastener 10. A screwdriver blade 50 in slot 14 in head 12, when rotated in a counterclockwise direction as indicated by the arrow, turns threaded fastener 10 causing the segments of thread 18 to engage inner thread 38, formed in the entry of receptacle 34, to thereby permit fastener 10 to be unscrewed. The illustration in FIG. 3 has been idealized to assist in the explanation of the invention.

While the fastener of the fastening system of the invention may be fabricated from any suitable material, plastic is preferred because of its strength, low cost and ability to withstand distortion. Material such as polypropylene, polyethylene and nylon are quite suitable. The receptacle can be made of any type of polymeric material.

Those skilled in the art will readily envision many other arrangements for affixing a member, such as panel 40, to an enclosure, such as enclosure 32, with the fastening system of the invention. The described embodiment is merely illustrative of the preferred form of the invention. As mentioned, a greater or lesser number of thread segments and slots may be utilized and alignment of the thread segments is not required. Similarly, a full inner thead 38 is not a requirement, it being only necessary to have some thread engaging surface, preferably located at the entry of the receptacle. Thus it should be clear that numerous changes in the described embodiment of the invention will be apparent to those skilled in the art without departing from its true spirit and scope. The invention is to be limited only as defined in the claims.

What is claimed is:

1. A fastening system comprising:
   a fastener means having a drive head and a threaded shank means, said threaded shank means including a plurality of resilient thread segments;
   receptacle means defining an orifice that is smaller than the greatest distance across said thread segments such that said resilient thread segments are deformed when said fastening means is inserted in said receptacle means; and
   thread engaging means in said receptacle means for engaging said thread segments and imparting a removal force to said fastener means upon rotation thereof.

2. The system of claim 1 wherein said thread engaging means comprises a threaded surface adjacent to the entrance of said receptacle means.

3. The system of claim 2 wherein said threaded shank means includes a generally cylindrical shank and wherein said receptacle means is generally cylindrical, the diameter of said receptacle means being greater than the diameter of said shank.

4. The system of claim 3 wherein said thread segments are tapered at their undersides to facilitate entry into said receptacle means.

5. The system of claim 4, further including a guide tip on said shank for aiding entry of said fastener means into said receptacle means.

6. The system of claim 5 wherein said drive head includes a screwdriver slot and wherein said resilient thread segments comprise groups of four segments.

7. A push in-screw out fastening system comprising:
   a molded, threaded fastener including a slotted head and a threaded cylindrical shank having a plurality of resilient thread segments;
   a tubular receptacle, having a diameter smaller than the widest expanse of said resilient thread segments, but larger than the diameter of said cylindrical shank, and a thread engaging section adjacent the entry of said tubular receptacle for imparting a removal force to said threaded fastener upon rotation of said slotted head.

* * * * *